Patented Nov. 27, 1928.

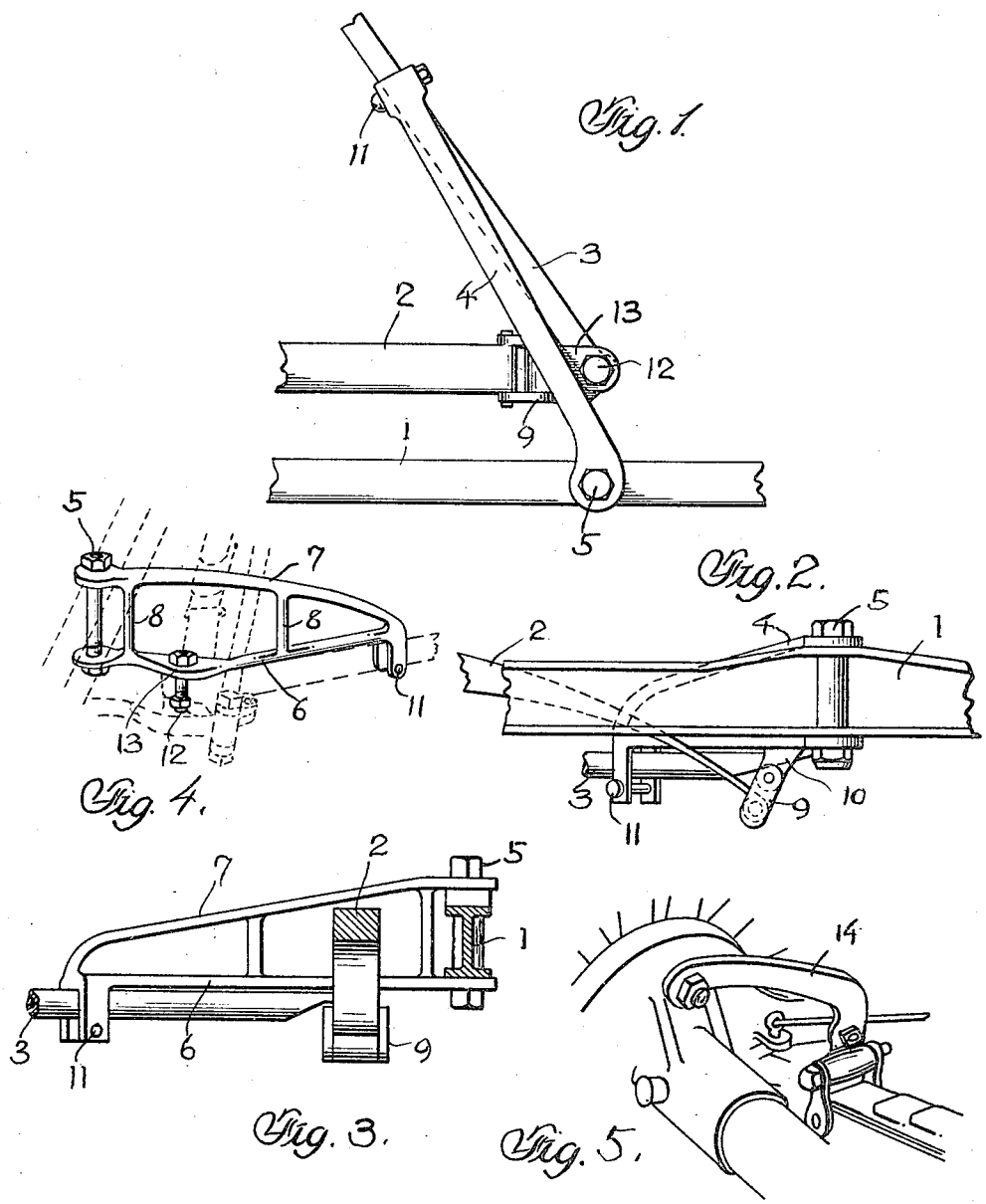

1,693,490

UNITED STATES PATENT OFFICE.

ELVIN D. MORTON AND JACK BRETT, OF INDIANAPOLIS, INDIANA.

MEANS FOR LOWERING THE HEIGHT OF THE CHASSIS OF MOTOR VEHICLES.

Application filed June 12, 1925. Serial No. 26,630.

Figure 1 is a plan view of the invention as applied, parts being broken away.

Figure 2 is a front view of the same.

Figure 3 is a side view of the same.

Figure 4 is a perspective view of the invention, the adjacent and connected parts of the car being shown in dotted lines.

Figure 5 is a perspective view of the means for lowering the height of the chassis in rear as applied.

The invention has relation to means for suspending the frame or chassis of automobiles, having for an object to provide such a means applicable to cars of the Ford type for lowering the height of the chassis thereof, and it consists in the novel construction and combinations of parts as set forth in the appended claims.

In the accompanying drawings illustrating the invention, the numeral 1 designates the front axle of the car, 2, the front spring and 3 is one of the front radius rods, the latter being commonly bolted to the front axle, and 4 is an alignment yoke or three point truss suspension device, having at its forward end vertical bolt connection 5 with the front axle 1, there being two of these suspension devices 5, one connected through a bolt 5 with each end portion of said front axle, and extending rearwardly of said axle and inwardly in converging relation or towards each other. Each suspension device 5 is in the nature of a truss having its lower or tie rod 6 extending at its forward end beneath said front axle, its upper or strut rod 7 extending at its forward end above said front axle, which is thus embraced by the forward ends of said suspension device and connected thereto by the vertical bolt 5, the axle 1 taking the place of the king post of the truss, and being entirely rigid will truss up the lower or tie rod of the truss through the suspension rods 8, 8, located intermediately of said device, to the strut rod 7.

In the present instance the front axle will be moved farther forwardly than is common with cars of this type, making a longer wheel base for the car, the front spring 3 being hung in rear of said front axle, by the shackles 9, 9, each connected to a lower lug 10, of the related suspension device 5, said lug 10 being located near the forward end of the truss form suspension device and forming an extension downwardly of the lower tie rod thereof, the result being that the weight of the chassis or frame or the load will be transmitted through the forward end portion of the truss form suspension device almost directly to the front axle, said device being at its rear end clipped or bolted at 11 to the related front radius rod near the forward end thereof, said forward end of the radius rod being bolted at 12 to a lug 13 extending laterally from the lower or tie rod of the device 5. In this way the radius rods are rigidly connected to the truss form suspension devices which form extensions of said rods having no tendency to twist at the points of connection to the ends of the radius rods. The suspension devices 5 of truss form, the front axle, and the radius rods form a rigid unit. The rear end clip connection 11 is made by means of depending parallel lugs of the tie rod 6 provided with horizontal bolt holes engaged by a horizontal bolt and considerably spaced from the lateral lug 12 and bolt 13.

The advantages claimed in addition to the lowering of the frame or chassis and the longer wheel base, are that the torque resulting from strain due to the application of the front wheel brakes and to road shocks is better resisted; that the strain upon the front radius rods is applied to points thereof more capable of resisting the same; that the front axle is maintained in mechanically correct position for all applied conditions, and that the side thrust of the car is better controlled.

The chassis is lowered in rear to accord with the forward lowering thereof by suitable means 14, the problem being much simpler than the lowering of the chassis forwardly and involving no change in the rear radius rod connections.

We claim:—

1. The combination with an automobile, of means for lowering the height of the chassis, comprising rearward extending trusslike suspension devices attached at their forward ends to the front axle, said suspension devices having near their forward ends lug extensions to one of which the related end of the front spring has shackle connection and to the other of which the related radius rod has connection, said suspension devices having at their rear ends each a second connection with said front radius rods near the forward ends thereof and forming a rigid unit with the front axle and the front radius rods.

2. A horizontally elongated truss-like suspension device for the purpose stated having a horizontal tie rod, an upper strut rod, vertical suspension rods connecting the tie rod and the strut rod, the tie rod and the strut rod having at their front ends a vertical bolt for connection with the front axle, said tie rod having near its forward end a lateral lug having a vertical bolt for connection with the radius rod and a depending extension having a horizontal bolt for connection with the spring shackle, said tie rod having at its rear end depending parallel lugs having a horizontal bolt for connection with the front radius rod at a point considerably in rear of said lateral lug.

In testimony whereof we affix our signatures.

ELVIN D. MORTON.
JACK BRETT.